United States Patent [19]

Larson et al.

[11] 4,256,315
[45] Mar. 17, 1981

[54] MECHANICAL END FACE SEAL WITH DIRT EXCLUDER LIP

[75] Inventors: Ellis Larson, Arlington Heights; Burton K. Olsson, Park Ridge, both of Ill.

[73] Assignee: CR Industries, Elgin, Ill.

[21] Appl. No.: 87,239

[22] Filed: Oct. 22, 1979

[51] Int. Cl.³ .............................................. F16J 15/34
[52] U.S. Cl. ......................................... 277/92; 305/11
[58] Field of Search ................. 277/82, 88, 92; 305/11

[56] References Cited

U.S. PATENT DOCUMENTS

| 3,241,844 | 3/1966 | Morley | 277/92 |
|---|---|---|---|
| 3,372,940 | 3/1968 | Keller | 305/11 |
| 3,392,984 | 7/1968 | Reimsma et al. | 277/92 |
| 3,940,154 | 2/1976 | Olsson | 277/92 |

*Primary Examiner*—Robert I. Smith
*Attorney, Agent, or Firm*—James T. FitzGibbon

[57] ABSTRACT

A seal and sealed mechanism adapted to prevent dirt from entering portions of the seal cavity. The seal includes at least one annular primary seal ring of generally L-shaped cross-section and having a sealing surface formed on one side of the radial flange of the primary ring. An elastomeric secondary seal ring is also provided, with such ring being generally parallelogram-shape in cross-section. The inner diameter of the secondary ring fits snuggly in use over the outer diameter of the axial flange of the primary ring. A dirt excluder lip extends outwardly from one face of the secondary seal ring and covers the end portion of the radial flange of the primary ring to prevent foreign material from entering the cavity between the outer inclined surface of the secondary ring and the end surface of the radial flange of the primary ring. The excluder lip is effective in various axial positions of the seal. The seal may comprise a pair of identical primary and secondary rings in face to face relation. The seal may be incorporated in a sealed mechanism such as a track roller, track pin, or final drive for a crawler tractor or the like.

12 Claims, 9 Drawing Figures

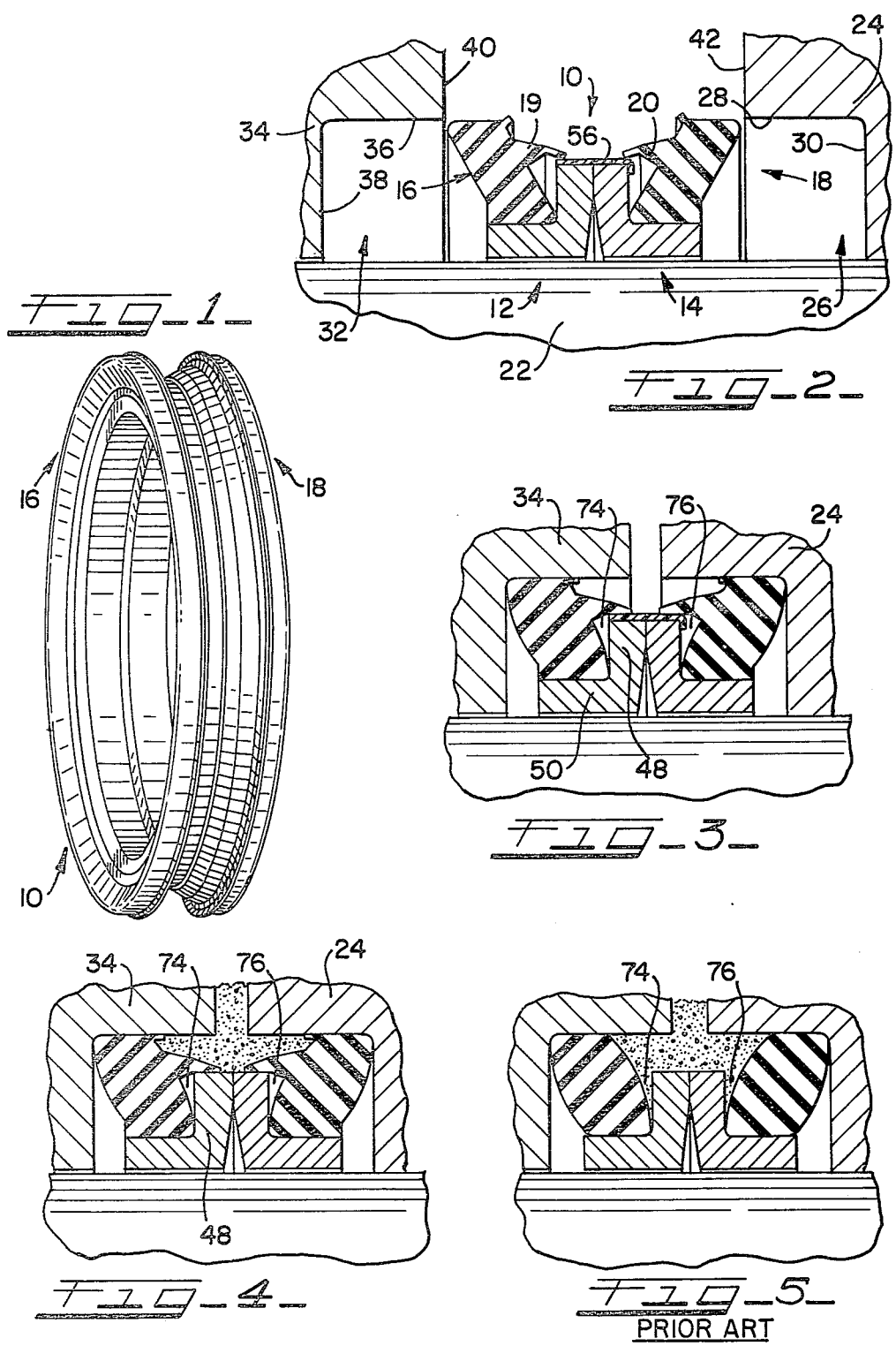

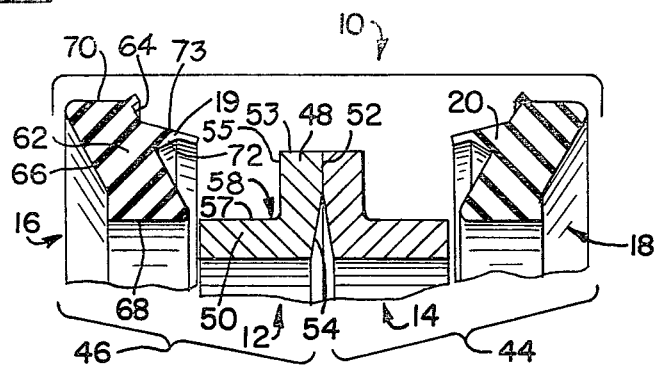
FIG. 6
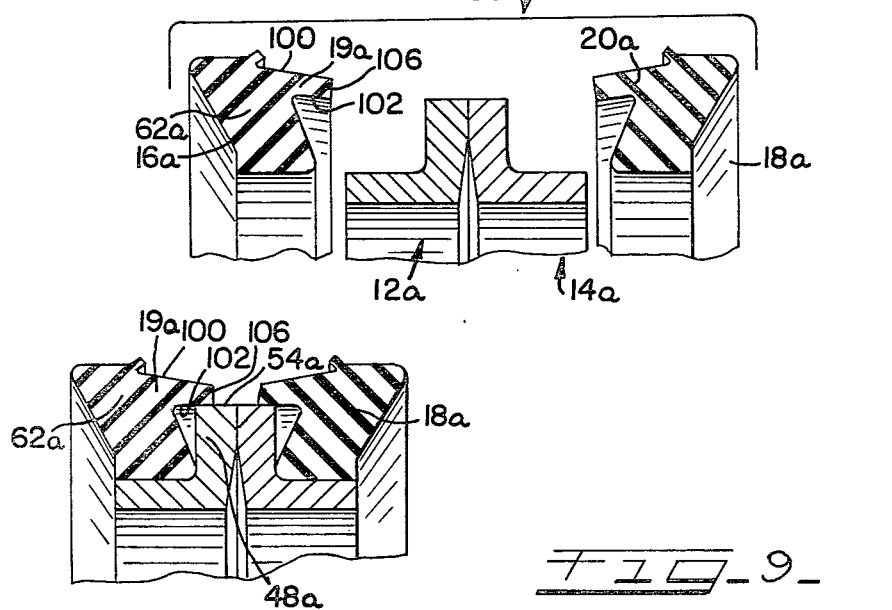
FIG. 7
FIG. 8
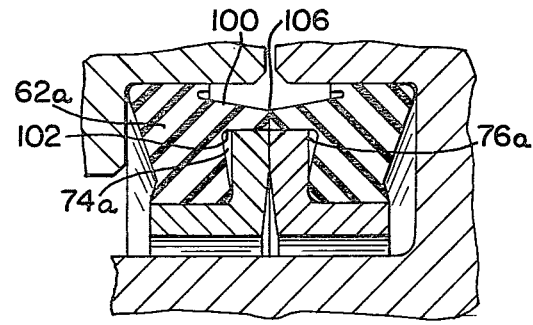
FIG. 9

MECHANICAL END FACE SEAL WITH DIRT EXCLUDER LIP

BACKGROUND OF THE INVENTION

The present invention relates generally to oil seals and more particularly, to so called heavy-duty rotary end face seals designed for application in severe service environments wherein conditions of soil, weather, etc., are destructive of seals and sealed mechanisms. The invention comprises an improvement over known heavy-duty grit seals of a similar nature, such as seals of the type shown in U.S. Pat. No. 3,241,843, and other patents.

Seals of the type with which the invention is concerned are commonly used to exclude water, sand, grit and the like from lubricated assemblies used on earthmoving equipment. Typically, the seals are used in track rollers and final drives of track laying vehicles such as bulldozers, shovels, drag ling buckets, etc. The rollers, idlers, and final drives of such vehicles are commonly exposed to mud, dust, sand and rocks, and are often called upon to operate or stand under water, and to operate in other conditions which vary from desert to the arctic environments. Such seals are successful because even under these conditions, they are able to exclude the grit and other material in the working environment from the sealed parts, namely, the bushings, rollers, or the like.

Unquestionably, the most successful types of seals used in these applications have been those which use one or two ring-like rubber members to support oppositely directed, cooperating metal primary seal rings. Typically, a seal of this type includes a pair of annular rings having frustoconical cross sections and made from a synthetic elastomer, with a pair of annular abrasion resistant metal rings of L-shaped cross section being supported by the rubber members and having the radially extending, axially facing end portion of the metal rings in abutting end face relationship.

According to this seal concept, the outer diameters of the rubber rings, which act as a secondary seals, are received in place within counter-bores on adjacent, relatively movable parts of the vehicle. When the installation is complete, the sealed parts are moved axially together so that the seal assembly as a whole undergoes axial compression, and because of the configuration of the rubber members, a radial compressive load is applied to the axially extending flanges of the primary seal rings by the inner diameters of the rubber rings.

In use, as a certain amount of axial movement takes place, the rubber rings are compressed to a greater or less extent between two extremes. The geometry, size and composition of the rubber members are arranged such that, with the seal being most tightly compressed, the axial load applied to the opposed metal working faces of the seal will not be so high so as to create undue resistance to rotation and consequent overheating, while under conditions of the least anticipated axial compression, a predetermined minimum axial force is provided to prevent outward leakage of oil and ingress of grit particles and/or water between the seal faces. The difference between the maximum and minimum axial thickness of the seal assembly is a distance referred to as the working range or working height range of the seal.

Because of the structural characteristics of the rubber rings, the working range of this type of seal is generally quite large. The rubber and metal parts both provide excellent abrasion resistance, and consequently, seals of this type commonly last for the entire working life of the sealed part.

As is the case with almost every engineered product, however, there have been certain conditions which occasionally have created premature wear and/or potential failure in seals of the type just described.

One such problem in particular has been that, as the external seal cavity continually works in a severe environment, it fills completely with grit, sand, water, mud, etc. The area radially outside of the seal becomes tightly packed with such material, or such material enters in the fluid state and becomes frozen in place. When excessive mud is packed between radial flanges of the metal rings and exposed exterior faces of the rubber rings, the effective spring rate or stiffness of the rubber parts in axial compression increases to such an extent that the seals may be compressed beyond their design limit, thereby wearing out prematurely in use. In addition to this mode of failure, the mud pack may dislodge the rubber rings from the metal rings and cause leakage.

Consequently, in view of the foregoing shortcomings of certain forms of prior art seals, it is an object of the invention to provide an improved heavy duty grit seal.

Another object is to provide a heavy duty seal unit which will minimize cost and expense in use.

A still further object of the invention is to provide a seal in which the secondary members include especially adapted portions intended to cover those parts of the sealing mechanism which are required to be maintained in a flexible condition.

A still further object is to provide a seal in which the elastomeric and metal parts have cooperating surfaces which serve to define between them a recess or grit-free area which will allow movement from time to time of parts of the sealed member which, in effect, act as springs for the primary seal members.

A still further object is to provide a seal unit wherein the rubber members include a lip or flange adapted to be received over the radially outer end of a generally radially extending flange of the primary seal ring with the lip or flange having an end portion which is adapted to move axially as the rubber seal portion expands and compresses axially.

The foregoing and other objects and advantages of the invention are achieved in practice by providing a seal unit having a primary seal ring with a generally L-shaped configuration and an annular secondary seal ring of generally parallelogram cross section, with the secondary seal ring further including an integrally formed lip or flange adapted to extend over the radially outer part of the primary seal ring so as to prevent foreign material from lodging between an outer face of the secondary seal and one radial face of the primary seal ring.

The manner in which these and other objects and advantages are achieved in practice will be more clearly understood when reference is made to the following detailed description of the preferred embodiment of the invention set forth by way of example and shown in the accompanying drawings in which like reference numbers indicate corresponding parts throughout.

BRIEF DESCRIPTION OF THE DRAWINGS

FIG. 1 is a perspective view of a seal assembly incorporating the features and advantages of the present invention, and shown before installation thereof;

FIG. 2 is a fragmentary vertical sectional view, on an enlarged scale, showing the principal elements of a seal made according to the invention and showing the seal unit itself preassembled prior to installation in a pair of cooperating parts to be sealed;

FIG. 3 is a view similar to that of FIG. 2 and showing the seal in an installed position of use;

FIG. 4 is a view similar to that of FIGS. 2 and 3 and showing the dirt exclusion feature provided by the seal of the invention;

FIG. 5 is a fragmentary vertical sectional view of a prior art seal, showing a problem with prior art seal constructions intended for heavy duty use.

FIG. 6 is a fragmentary vertical sectional view of the seal of FIGS. 1–4, showing the seal even prior to preassembly thereof.

FIG. 7 is a view similar to FIG. 6, but showing a modified form of seal made according to the invention;

FIG. 8 is a view similar to FIG. 7, showing a modified form of seal in a preassembled condition; and FIG. 9 is a vertical sectional view of the seal of FIGS. 7 and 8, showing the same in an installed condition within a sealed mechanism.

DESCRIPTION OF THE PREFERRED EMBODIMENTS OF THE INVENTION

While it will be understood that the invention may be embodied in different forms, two preferred embodiments will be illustrated wherein the seal assembly of the invention comprises left and right hand parts arranged in mirror image form, with each left and right hand part being identical to its oppositely directed counterpart. Seals of this type are commonly referred to as two-piece seals, inasmuch as each of the right and left hand halves includes two different pieces, a relatively rigid ring referred to as a primary seal ring, and an elastomeric secondary seal ring element which will be described in detail herein.

Referring now to the drawings in greater detail, FIGS. 1–4 and 6 show a pair of the two-piece seals of one form of the invention arranged in mirror image form to comprise a seal assembly generally designated 10 and including left and right hand primary seal rings 12, 14 and left and right hand secondary seal rings 16, 18 with each of the secondary rings 16, 18 including a dirt excluder lip portion 19, 20 which covers an outer surface of a portion of the primary rings.

FIG. 2 shows the seal assembly of the invention, after seal preassembly but before installation thereof in a typical mechanism such as a bulldozer track roller. As shown in FIG. 2, a shaft, generally designated 22 is shown to have fixed in place thereover an end cap 24 which is pressed or otherwise so as to be fixed to the shaft 22, and which includes a counterbore generally designated 26 and shown to include an axially extending wall 28 and a radially extending end wall 30. A counterpart counterbore 32 is formed in a left hand sealed part 34, such as a track roller or the like, also includes an axial wall 36 and a radially extending wall 38. It will be understood that the machine part 34 is adapted to be moved axially to the right as shown in FIG. 2 into a position wherein its outer end face 40 will be spaced apart a slight distance from the counterbore surface 42 on the end cap 24. When these parts are pushed together, the seal unit is installed in place within a vehicle, assuming the position shown in FIG. 3.

Referring now particularly to FIG. 6, the seal unit generally designated 10 is shown to include a right hand two-piece seal assembly generally designated 44 and a left hand two-piece seal assembly generally designated 46. The left hand assembly 46 includes the primary seal ring 12 and the secondary seal ring 16; the right hand assembly includes a counterpart primary ring 14 and a right hand secondary seal ring 18. The left hand primary seal ring 12 is shown to be generally L-shaped in cross-section and to include a radially extending flange 48 and an axially extending flange 50. A seal band 52 is formed on the radially outer part of the axially directed, radially extending face 54 of the radial flange 48. The radial flange terminates in a radially outwardly facing, axially extending end surface 53 which, in the embodiment of FIG. 2, is covered by a sleeve 56 of a plastic material referred to elsewhere herein. This sleeve 56 is not shown in FIG. 6, and, according to the invention, while such sleeve is useful, it is not necessary and is not used in all embodiments of the invention.

Referring again to FIG. 6, the radial flange 48 also includes an oppositely directed radial face 55 which cooperates with a radially outwardly directed, axially extending surface 57 of the axial flange 48 to form a seat 58 for receiving the secondary seal ring 16.

Referring now to the secondary seal ring 16, this unit includes a main body portion 62, and inclined, generally parallel first and second faces 64, 66 as well as radially inner and outer, axially extending surfaces 68, 70. The body 62 of the secondary ring 16 includes the dirt excluder lip 19 which is formed integrally with the body 62 and which lies between its radially inner and outer surfaces. The lip 19 has a radially inner, contoured surface 72 which closely overlies the plastic material 56 (FIG. 2) and also the surface 54, beomg biased radially inwardly thereagainst by its inherent resiliency. The lip 19 is also partially defined by a radially outer surface 73.

The surfaces defining the right hand two-piece seal assembly 44 are identical to their counterparts just described and accordingly, an additional description thereof not being necessary to an understanding of the invention, such description will be omitted.

Referring now to FIG. 3, the seal is shown in its installed position of use. From this view, it will be noted that the seal assembly has been subjected to axial compression by moving the machine part 34 closer to the end cap 24. This causes the parallelogram-shaped secondary seal members 16, 18 to tend to become somewhat more upright, with the parallel end surfaces 64, 66 thereof also bulging slightly outwardly to form convex surfaces. The effect of moving the sealed parts together is to apply an axial or primary sealing force to the primary seal rings, and also to increase the radial compressive load applied to these rings so that sufficient torque can be transmitted from the relatively movable parts 34, 24 to the seal rings 12, 14 which move with respect to each other, but not with respect to their associated sealed parts, in the use of the apparatus.

In this connection, it will be understood that the principal relative motion is between the seal face 52 and its oppositely disposed counterpart as the parts 34, 24 rotate with respect to each other. This area is referred to as the seal band, or face contact area, and the seal thereby created is referred to as the primary seal.

The seal between parts which do not move relative to each other, namely the inner and outer surfaces of the rubber secondary seal rings 16, 18 and their associated counterbores and primary seal ring surfaces are customarily referred to as secondary seals. Accordingly, in the construction shown, the rubber seal rings 16, 18 serve the functions of transmitting torque, applying radial compressive load, and also use their inherent resiliency to supply an end load to the faces which are in mutual sealing engagement. Furthermore, the rubber-to-metal engagement provides a secondary seal to exclude grit and retain oil in the seal cavity.

Referring again to FIG. 3, it will be noted that there are a pair of cavities designated 74, 76 defined by the radially inner side 72 of the lip 19, and the surface 55 which lies radially outwardly of the seat portion 58 of the left hand primary ring and its right hand counterpart. In the past, this area, as shown in FIG. 5, has become filled with dirt under severe conditions and has restricted the ability of the secondary seal member to assume different shapes under varying degrees of axial compression, creating an undesirably great stiffness or high spring rate in such rubber members.

Accordingly, the seal of the present invention includes the auxiliary or dirt excluder lips which provide a tight additional secondary seal for this area by overlying the respective radially outer end surface portions of the primary rings.

While the seal of the present invention retains all the operational advantages of earlier two piece seals, including the ability to select an advantageous spring rate, the novel lip construction prevents this spring rate from being adversely affected by localized accumulations of dirt in the seal cavity area.

Referring again to FIGS. 2 and 3, and particularly to the plastic cylindrical sleeve 56, this unit is preferably a shrink fit piece of this plastic film which is used to hold the seal unit in a preassembled relation, so that the finely ground and finished seal end faces are protected against damage during assembly. When the seal is placed in use, the seal faces are still free to rotate with respect to each other, however, and after a short time, grit entering the exterior portion of the seal cavity abrades the plastic away without damage to the seal. In certain larger size seals, the plastic band 56 is not used at all. On other models, the plastic band is provided to aid assembly but is removed just prior to seal assembly for ease of installation.

Accordingly, FIG. 4 shows a seal wherein the cavity is subjected to dirt and grit and wherein the plastic cylindrical sleeve 56 has been worn away. However, the protective lips 72 remain tightly in place over the end surfaces and prevent grit from entering the intermediate cavities 74, 76. Because the geometry of the generally parallelogram shaped secondary seal rings change in use with variations in axial load, it is required that the protectie lips be stiff enough to be self-supporting and to exclude grit, but not so thick as to create a seal ring having an ovrall cross-section which is too stiff. The illustrated forms follow this principle by having the lip extend well out from the body and leaving an adequate working space for flexure in the region 74.

Other two-piece seals are known in the prior art which are variations of seals such as those shown in U.S. Pat. No. 3,241,843. The principles of the present invention, namely forming a generally axially outwardly extending protective lip from the secondary seal body are applicable to such constructions as well. p While a wide variety of materials are suitable for use in making seals according to the invention, one form of seal which uses a special alloy such as "Haynes 93" or other extremely hard material has been very successful in use. Other alloys suitable for making primary seal rings according to the invention are described in the patent literature, including U.S. Pat. No. 4,094,514.

Other alloys have been used or proposed for use with seal rings of this type, including various forms of stainless steel, tool steel or, in low cost or light duty applications, ordinary steel.

In some applications, it is also possibto manufacture the primary ring from a relatively rigid non-metal material such as certain plastic or composite materials including phenolic plastics, filled materials such as carbongraphite, various impregnated materials, etc. In other cases, the body of the primary seal ring may be made from a flexible material which is radially supported by a stiffer element such as a stiffener made from metal or plastic.

In other constructions, the primary ring is somewhat flexible but is radially supported by part of the sealed mechanisms.

The elastomeric or secondary ring member is preferably made from a synthetic rubber having good abrasion resistance and good elastic properties. The materials which have been successfully used include nitrile or "Buna-N" type rubbers with Durometer values from about thirty-five to seventy-five. Other rubber materials may be selected depending upon the use environment of the seal.

In the form of seal shown in FIGS. 2 through 4, the excluder lip has been shown to be relatively thin, and to have tapering inner and outer surfaces. Other forms of seal have been made, however, wherein the excluder lip is of relatively thicker cross-section with the inner and outer surfaces of excluder lip being approximately parallel to each other.

Such a construction is illustrated in FIGS. 7-9, wherein a seal assembly 10a is shown to include left and right hand primary seal rings 12a, 14a, left and right hand secondary seal rings 16a, 18a. In the embodiments of FIGS. 7-9, the excluder lips 19a, 20a are different from their counterparts in the embodiments of FIGS. 1-4 and 6 as will appear herein; however, the other portions of the seal are substantially identical and accordingly are not described in detail.

Referring now to FIG. 7, the excluder lip 19a is shown to have an exterior or radially outwardly directed, axially extending surface 100 and an inner, generally axially extending surface 102. As shown, the surfaces 100, 102 may not be true axial surfaces but may be inclined somewhat inwardly at the ends of the auxiliary lip most remote from the seal body 62a. In the construction shown, a relatively blunt, annular end face 106 forms the remote end of the auxiliary or dirt excluder lip 19a.

As shown in FIG. 8, when the seal is preassembled and ready to be installed in the seal cavity, the seal faces 100, 102 are nearly parallel although the inner surface may be almost a truly axial surface as a result of an interference fit relation between it and the radially outer surface 54a of the radial flange 48a. The end surface 106 of the auxiliary lip 19a is spaced aprt from its counterpart on the right hand side secondary seal ring 18a prior to installation, when the seal body 62a and its counterpart are in an unstressed condition, with the parallelogram-shaped cross-section then assuming a moderate angle with respect to a true radial plane.

Referring to FIG. 9, the seals are shown installed and under substantial axial compression. Here the surfaces 100, 102 are in approximately the same relation as described above; however, the axial end face annular surface 106 abuts or nearly abuts its counterpart, regardless of the exact position of the end face 106, the seal still excludes dirt from the intermediate seal cavities 74a, 76a because the lip 19a and its counterpart closely overlie the outer surface of the primary ring radial flange 48. In the form shown in FIG. 9, the angle between a true radial plane and that formed by the frustoconical seal body 62a and its right hand counterpart is decreased to about one-half or less the angle shown in the relaxed or unstressed condition of the seals shown in FIGS. 7 and 8, for example. In use, the seals of the form of FIGS. 7-9 operate in the same manner as the counterparts of FIGS. 1-4 and 6.

The exact configuration of the lip is not critical, it being required only that the cross-sectional shape of the rubber member be approximately that shown, and that the excluder lip be adapted to be held down by its own inherent resilience over the radially outwardly directed, axially extending surface of its associated primary seal ring radial flange. In such form of seal, the axially opposed edges of the excluder lip may abut or approach abutting relation with each other as the seal moves to its maximum compressed position or so-called minimum installed height.

The drawings also show that the secondary seal ring includes a "heel portion", i.e., a portion of increased axial extent near its inner diameter. These and other slight variations in shape are made for particular applications and are known to those skilled in the art to be acceptable variations of the frustoconical seal secondary ring described in detail herein. Accordingly, it will be understood that in the specification and claims, the expressions "frustoconical", "Parallelogram" and the like are used in the general illustrative sense and not in a strictly limited geometric sense.

In use, it has been found that seals made according to the present invention provide improved performance and additional flexibility in use under even very severe conditions and do so while using known technology and at minimal increase in cost.

It will thus be seen that the present invention provides a novel heavy-duty rotary end face seal having a number of advantages and characteristics including those pointed out above and others which are inherent in the invention. Preferred embodiments of the invention having been described by way of illustration only, it is anticipated that changes and modifications of the described oil seals will occur to those skilled in the art and that such changes and modifications may be made without departing from the spirit of the invention or the scope of the appended claims.

I claim:

1. A heavy duty seal unit adapted to cooperate with a sealed mechanism comprising first and second, relatively movable machine parts, said seal being adapted to retain lubricant within said sealed mechanism and to exclude contaminants therefrom, said seal unit comprising, in combination, at least one primary seal ring and a combination secondary seal ring and force-applying element associated therewith, said primary seal ring being formed from a rigid material, being annular and having a generally L-shaped cross-section and including a radial flange and an axial flange, said radial flange having a radially outwardly facing surface, a seal-forming end face comprising at least a part of one radially extending surface of said radial flange and an oppositely directed radially extending surface, said axial flange having a radially outer, axially extending surface, said oppositely directed radial surface of said radial flange and said axially extending outer surface cooperating to define a seat for receiving said secondary seal ring, said secondary seal ring being made from an elastomer, having an annular configuration and including a body portion of generally parallelogram cross-sectional shape with axially extending, radially facing inner and outer end surfaces and first and second inclined body sidewall surfaces lying generally parallel to each other, said body also having an excluder lip portion integrally formed with said body, said lip also having radially inner and outer surfaces, and extending generally axially outwardly from one of said body sidewall surfaces, with a part of said inner lip surface overlying at least a portion of of said radially outwardly facing surface of said radial flange of said primary seal ring so as to seal the region between said radially inner surface of said excluder lip, said oppositely directed radial surface of said primary seal ring and the radially inner part of one of said body sidewall surfaces.

2. A seal unit as defined in claim 1 wherein said radially inner and outer surfaces of said excluder lip taper toward each other as said surfaces extend away from said body sidewall surface.

3. A seal unit as defined in claim 1 wherein said primary ring member is made from a highly wear resistant iron alloy material.

4. A seal unit as defined in claim 1 wherein said secondary seal ring is made from a synthetic elastomer having a hardness of from about 55 to about 65 on the Durometer scale.

5. A seal unit as defined in claim 1 wherein said at least one primary seal ring and said secondary seal ring comprises a pair of primary seal rings and a pair of secondary seal rings, said rings being arranged with said seal forming end faces thereof in oppositely directed, abutting relation.

6. A seal unit as defined in claim 1 wherein said first and second inclined body sidewall surfaces are substantially frusto-conical in the relaxed condition of said secondary seal ring, said sidewalls bulging axially outwardly away from each other when an axial compression load is applied to said seal assembly.

7. A seal unit as defined in claim 1 wherein said radially inner and outer surfaces of said excluder lip are, in the unstressed condition of said seal and as said seal is manufactured, substantially parallel with each other, with said lip as a whole tapering slightly radially inwardly as it extends axially outwardly from said body sidewall surface.

8. A sealed mechanism comprising, in combination, first and second relatively movable machine parts, each of said machine parts having a seal-receiving counterbore arranged in oppositely facing relation, and a seal assembly having one portion thereof received in one of said counterbores and the other portion thereof received in said other counterbore, said seal unit comprising, in combination, a pair of primary seal rings and a pair of combination secondary seal rings and force-applying elements associated with said primary seal rings, each of said primary seal rings being formed from a rigid material, being annular and having a generally L-shaped cross-section, including a radial flange and an axial flange, each of said radial flanges having a radially outwardly facing surface, a seal forming end face comprising at least a part of one radially extending surface of said radial flange and an oppositely directed radially extending surface, said seal forming end faces being in abutting relation with each other, each of said axial flanges having a radially outer axially extending surface cooperating with said oppositely directed radial surface of said radial flange so as to define a seat for receiving one of said secondary seal rings, each of said secondary seal rings being made from an elastomer, having an annular configuration and including a body portion with generally parallelogram cross-sectional shape defined by an axially extending, radially facing inner surface received over said axially extending surface of said axial flange and an outer surface received in a part of said counterbore, each body being further defined by first and second inclined body sidewall surfaces lying generally parallel to each other in their relaxed condition, each body also having an excluder lip portion integrally formed with said body, each of said lips also having a radially inner and a radially outer surface, said lips extending generally axially outwardly from its associated body sidewall surface, with a part of each of said inner lip surfaces overlying at least a portion of said radially outwardly surface of said associated primary seal ring radial flange so as to create a seal in each of the regions lying between said radially inner surface of said excluder lips, said oppositely directed radial surfaces of said primary seal rings and said radially inner parts of one of said body sidewall surfaces.

9. A sealed mechanism as defined in claim 8 wherein said radially inner and outer surfaces of said excluder lip taper toward each other as said surfaces extend away from said body sidewall surface.

10. A sealed mechanism as defined in claim 8 wherein said primary ring members are made from a highly wear resistant iron alloy material.

11. A sealed mechanism as defined in claim 8 wherein said secondary seal rings are made from a synthetic elastomer having a hardness of from about 55 to about 65 on the Durometer scale.

12. A seal mechanism as defined in claim 8 wherein said radially inner and outer surfaces of said excluder lip are, in the unstressed condition of said seal and as said seal is manufactured, substantially parallel with each other, with said lip as a whole tapering slightly radially inwardly as it extends axially outwardly from said body sidewall surface.

* * * * *

UNITED STATES PATENT AND TRADEMARK OFFICE
CERTIFICATE OF CORRECTION

PATENT NO. : 4,256,315
DATED : March 17, 1981
INVENTOR(S) : Ellis Larson and Burton K. Olsson It is certified that error appears in the above—identified patent and that said Letters Patent is hereby corrected as shown below:

Column 4, line 39, "beomg" should be -- being --;

Column 5, line 59, "ovrall" should be -- overall --;

Column 5, line 68, delete "p" after the word "well";

Column 6, line 12, "possibto" should be -- possible to --;

Column 6, line 65, "aprt" should be -- apart --;

Column 8, line 21, delete the word "to" the first occurrence;

Column 9, line 7, after the word "abutting", add the word -- sealing --.

Signed and Sealed this

Sixteenth Day of June 1981

[SEAL]

Attest:

RENE D. TEGTMEYER

*Attesting Officer*  *Acting Commissioner of Patents and Trademarks*